July 23, 1946.   H. PFLEUMER   2,404,594

REINFORCED BUOYANT RUBBER DISK

Filed June 6, 1942

INVENTOR.
Hans Pfleumer
BY
ATTORNEY

Patented July 23, 1946

2,404,594

UNITED STATES PATENT OFFICE 2,404,594

REINFORCED BUOYANT RUBBER DISK

Hans Pfleumer, New Brunswick, N. J., assignor to Rubatex Products, Inc., New York, N. Y., a corporation of Delaware Application June 6, 1942, Serial No. 446,069

5 Claims. (Cl. 9—8)

This invention relates to rigid cellular closed cell gas expanded rubber used for floats or other buoyancy purposes where a heavy hydrostatic pressure must be resisted by the float, and is thus more particularly adapted to floats for submarine use where the float may be subjected to pressures of as much as two hundred pounds per square inch which obtains at a depth of approximately four hundred and fifty feet in water.

Essentially, the float consists of a cylindrical member preferably in the form of a disk to which any apparatus which is to be buoyed up or floated is attached. Preferably the means of attachment is through a hole in the center of the disk.

Rigid closed cell gas expanded rubber wherein the cellular structure consists of a multiplicity of minute cells which are non-communicating, is a material which has already been set forth in Reissue Patent No. 21,245 and Patents Nos. 2,086,513 and 2,110,400, all of which are assigned to the assignee of the present invention.

This material distinguishes from sponge rubber in that the multiplicity of cells are gas filled and do not communicate with each other. In sponge rubber, expansion is permitted to take place to such an extent that a multiplicity of communicating channels are formed. Accordingly, while in closed cell gas expanded rubber, the material is impervious to water, in sponge rubber the material is highly pervious to water, and thus cannot be utilized as a float.

The rigid closed cell gas expanded rubber thus formed has inherent strength owing to the quantity of sulphur included therein, in accordance with the patents above set forth, there being as much as fifty parts of sulphur to one hundred parts of rubber in the final vulcanized product. The material itself is very light. In fact, this rigid closed cell cellular material is produced in such manner that a cubic foot thereof can and does weigh less than four pounds, so that its specific gravity is of the order of .07.

The utilization of a disk or cylinder of this material for flotation purposes at the surface of water presents no special problem, since it is impervious to water, and since it has such low specific gravity that it may support members having a mass and weight many times its own. Where, however, the disk formed of this material is to be utilized at an extreme depth as much as four hundred and fifty feet below the surface, then great pressures of the order of two hundred pounds per square inch are impinged thereon, and there is a possibility of collapse of the cellular material.

Disks made of rigid closed cell cellular expanded rubber had been used for marine flotation purposes, but it has been found that the disks tend to become deformed unless a supporting or reinforcing structure is provided therefor.

In my co-pending application Serial No. 404,997, I have shown a manner of reinforcing rigid cellular rubber by means of metallic members. Such reinforcement necessarily adds weight, which is scarcely desirable in the disks which are to be used for marine flotation purposes.

I have discovered a new way of reinforcing my flotation disks in such manner as to scarcely increase the density of the material, so that its flotation characteristics are not impinged upon.

In the manufacture of closed cell rigid cellular expanded rubber, it has been found that the surface portions thereof adjacent the mold surfaces tend to form a hard, strong skin. This occurs owing to the transfer of heat from the mold surfaces to the rubber which tends to collapse the cells at the various surfaces to form them into a hard, continuous skin.

By forming a plurality of cylindrical holes through my flotation disks, I thus form a plurality of hard rubber cylinders therethrough, which cooperate with the hard skin on the surfaces of the disks to form supporting members.

Thus, for instance, in an optimum form, a floatation disk or cylinder of my invention may have seven such tubes or hollow cylinders formed therein consisting of a central opening or cylinder through which a supporting rope may be passed surrounded by a plurality of tubes or cylinders in hexagonal pattern, the surfaces of which consist of a hard rubber skin which act as supporting members between the outside surfaces of the rubber disks. Thus the floatation disk or cylinder is supported at a plurality of points and collapse of the cellular structure thereof is impeded. This adds very little, if any, to the density of the floatation disk or cylinder while increasing the structural strength thereof.

Since the structural supporting member is itself a tube of hard rubber forming the surface, again, the necessity for the utilization of other structural supports formed of heavier material such as metal is obviated.

An object of my invention therefore is the formation of a floatation member of rigid closed cell gas expanded cellular rubber which is reinforced.

Another object of my invention is the utilization of a plurality of tubular openings through the floatation member in order to reinforce the same.

As a corollary object of my invention, I provide a hard rubber skin for the surfaces of the tubular openings through my floatation member in order to form rigid supporting members therefor.

A primary object of my invention, as is obvious in the foregoing, is the provision of a floatation member which is rigid and relatively uncollapsible even at extreme pressure, and which is without substantial deformity at a depth of as much as four hundred and fifty feet below the surface of the water.

The necessity for this type of reinforcement of the buoyant member to withstand such extreme pressures should be obvious. Communication and signalling equipment are carried by submarines in such manner that they may be released to the surface while the submarine is at a great depth. The buoyant members which raise this equipment to the surface must primarily be able to buoy up this equipment when it reaches the surface. In order however that this may occur, it is essential that the buoyancy members are not destroyed when they are at extreme depths. Accordingly, it is necessary to reinforce these buoyancy members so that they will be able to carry out their function when they are released.

The foregoing objects, and many other objects of my invention will become apparent from the following description and drawing in which.

Figure 1:
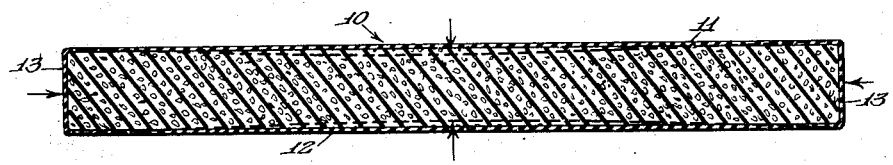
Figure 1 is a cross sectional view showing an ordinary floatation disk without any special means of securement to an object to be floated.

In Figure 1, I have shown a floatation member 10 which does not have any special reinforcing member or any specific means of support. This floatation member has a top wall 11, a bottom wall 12, and a side wall 13. It is formed of rigid closed cell cellular gas expanded rubber.

In the process of manufacturing rigid closed cell cellular gas expanded rubber, a rubber mix is prepared which contains a substantial amount of sulphur—as much as fifty parts of sulphur to one hundred parts of rubber, and other materials in accordance with the patents above mentioned. This mix is then subjected to an external gas pressure of nitrogen which readily permeates the entire mix. Upon relaxation of the external pressure after impregnation has occurred, the pressure of the internally impregnated gas causes an expansion of the rubber.

The mold in which this original expansion occurs confines the expansion to such an extent that the minute gas bubbles may expand the rubber to a cellular structure consisting of a multiplicity of minute closed cells without rupturing the cells. At the same time, a precure or partial vulcanization occurs by reason of applied heat which thus strengthens the rubber and prevents the bursting of the cell walls. After the rubber has thus been expanded, and precured, it is given a final vulcanization where it expands fully in a mold and is finally cured.

The original expansion or pre-cure may expand the rubber as much as seven times. The final expansion and cure expands the rubber approximately twenty per cent.

During the process of cell formation the surfaces of the rubber mix which impinge against the sides of the mold or the platen which forms the mold are heated up to higher degree than the interior and the gas content nearest the atmosphere escapes, thereby collapsing the outermost cells into a comparatively rigid skin.

Thus, rigid closed cell cellular expanded rubber is characterized by the fact that it is very light (specific gravity approximately from 0.07–0.15) that it consists of a multiplicity of minute discrete cells, that the cell walls are comparatively rigid, and that a hard skin is formed.

The member 10 of Figure 1 has this form. The interior thereof consists of the hard cellular material above described, while the surfaces 11, 12, and 13 are formed by the hard skin.

In Figure 1, the floatation member 10 is a disk, a cross sectional view of which is shown, the top and bottom surfaces being flat and the side cylindrical. When the disk is immersed in water under pressure, it is pressed in two directions, to wit, diametrically and axially. The diametric stress inwardly toward the central axis against the wall 13 may do no harm if the skin is hard enough, since this circular or cylindrical surface is well adapted to resist such forces and the major thickness of the disk is in this diametric direction.

The stress axially against the surfaces 11 and 12, is, however, strong enough to tend to collapse the faces and thus cause destruction of the cell. This collapse may occur, as shown by the dotted lines, to indent the surfaces 11 and 12, collapsing the cells in the vicinity thereof, and thus substantially reducing the floatation characteristics of the disk.

Figure 2:
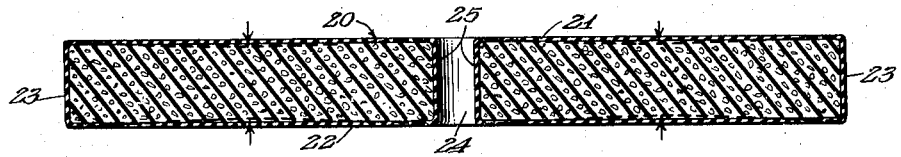
Figure 2 is a cross sectional view corresponding to that of Figure 1 showing, however, an opening in the floatation member in order to permit the passage of a rope therethrough.

In Figure 2, I have shown a similar disk 20 having a similar form including a top wall 21, a bottom wall 22, and a side wall 23. This disk is, in addition, provided with a central opening or perforation 24, this opening being cylindrical in form.

Where the opening is simply drilled or bored into a completed disk, no increase in strength thereof is obtained. Where, however, the surface 25 of the cylindrical opening 24 is so formed that a hard skin is produced thereat, similar to the skin at surfaces 21, 22 and 23, then this hard tubular skin extending through the rubber disk serves as a substantial support therefor.

As will be seen in Figure 2, therefore, when the disk is immersed in water at a great depth, the surfaces 21 and 22 thereof are supported between the side walls 23 and the skin 25 of the central cylindrical opening 24. Accordingly, the collapse of the surfaces 21 and 22 will not occur over a single flat expanse as in the case of Figure 1, but rather will occur between the side walls and the central opening 25.

It will thus be obvious that since an additional support is provided in the same disk, the extent of collapse of the surfaces 21 and 22 will be much less, and a comparison of the extent of collapse may be seen by a comparison of Figures 1 and 2.

In accordance with my invention, the interior of the disk is reinforced by a plurality of hard rubber cylinders made of its own material. The cylinders are preferably arranged equidistant for optimum efficiency. For instance, a hexagonal distribution is best as shown in Figure 3.

Figure 3:
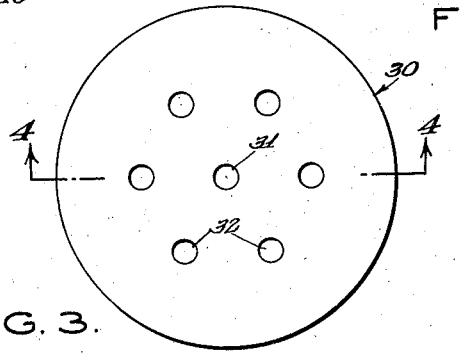
Figure 3 is a top plan view of a floatation member constructed in accordance with my invention showing the plurality of reinforcing openings therein.

In Figure 3, I have shown a floatation disk 30 of my invention having a central opening 31, and a plurality of openings 32, 32 each preferably equidistant from each other and from the edges or side walls 35 of the cylindrical floatation disk.

Figure 4:
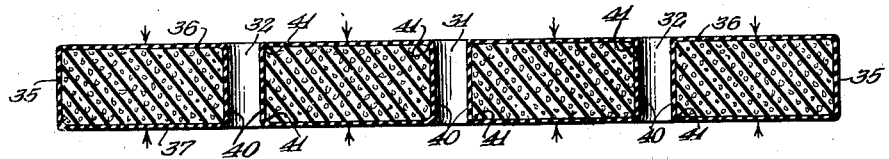
Figure 4 is a cross-sectional view taken on line 4—4 of Figure 3.

As seen also in the cross-sectional view of Figure 4, the cylindrical floatation disk has a top wall 36, a bottom wall 37, as well as the side curved walls 35.

Here again, forces applied diametrically are applied against the entire width of the disk and are resisted not merely by the width of the material, but also by the circular surface of the side wall 35. Forces applied against the surfaces 36 and 37 are resisted not merely by these surfaces, but also by the tubular hard skins 40 of the cylindrical openings or perforations 32 and 31.

As is seen in the cross sectional view of Figure 4, each of the openings 32 and 31 has a hard cylindrical skin which communicates with the hard skin of the top and bottom surfaces 36 and 37. This skin may by the processes hereinafter described be thickened at the corners 41, 41 in order to increase the force transmitting area. Accordingly, any forces now applied to the top and bottom surfaces are resisted not merely by these top surfaces, but also by a plurality of tubular hard skin rubber members surrounding the openings 32. Consequently, the collapse, if any, between these openings of the top and bottom walls, is relatively minute and does not interfere with the buoyancy qualities of the disk.

While I have here shown the utilization of seven such cylindrical openings to increase the structural strength of the disk, any number of openings may be used for this purpose. Preferably, however, they should be spaced equidistantly in order to preserve maximum efficiency.

I prefer to utilize the formation shown in Figure 3, however, with a central opening and six additional openings, arranged in the equidistant hexagonal pattern. Where the openings are of the order of one-half inch in diameter and are spaced from each other as is seen by less than one-quarter of the diameter of the disk, the axial as well as the diametrical pressure is relieved. The loss of volume is only about three per cent (in a ten inch disk which is one and a half inches thick). Contrasted with this slight loss of three per cent is the great increase in efficiency in that collapse of the disk, and the consequent loss of buoyancy thereof is prevented.

In the formation of the disk itself, it is necessary to utilize a process which will not merely form a skin on the surfaces of the disk in the manner previously described, but will also form a skin in the interior of the openings 32. For this purpose, it is desirable in the finishing step after the precure above described, when the rubber member is expanded to its final form that metallic members be brought into contact with the surfaces of the interior of the openings 32 in order to form the hard skin 40. Accordingly, the last step of the process is performed in the manner illustrated in Figure 5.

As I have previously pointed out, the partially expanded disk, which in this case is provided with the openings, is fully expanded during the final cure; and in doing so, the rubber expands uniformly in both directions, axially as well as diametrically.

The precured disks, therefore, before being placed in the finishing mold are perforated so that the centers of the holes are equidistant from each other and from the center to the edge. These holes are then filled tight with aluminum plugs 50, 51. The aluminum plug 51 passes through the opening which is to form the central hole and the aluminum plugs 50 pass through the remaining openings.

Figure 5:
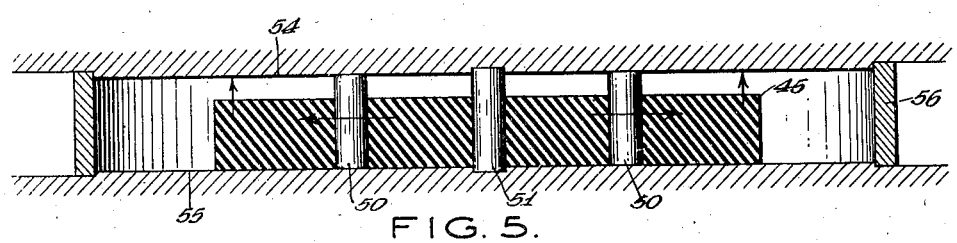
Figure 5 is a schematic cross-sectional view showing one step in the process of manufacture of the floatation member of my invention.

The final mold is defined by the top wall 54, the bottom wall 55 in the manner shown in Figure 5, and the circular cylindrical side wall 56. The center pin 51 may be held stationary with respect to the circumference 56 by being either supported in the bottom wall 55, or by both bottom wall 55 and top wall 54, while the remainder of the pins 50 are slidable within top plate 54 and bottom plate 55.

The pins 50, 50 are slightly shorter than the distance between the top and bottom walls 54 and 55 of the mold, so that they may move outwardly in accordance with the expansion of the precured disk 45.

The aluminum pins 50 and 51 provide an even distribution and conduction of the platen heat toward the interior. Also the utilization of these pins in the openings in the precured disks provides a simplified path by means of which any deleterious gases such as $H_2S$ which might burn up the cells may escape.

Just as the aluminum plugs serve as conductive paths from the platens 54 and 55 to the interior of the rubber disk to insure full vulcanization thereof, so also, as vulcanization progresses, any undue heat which is generated within the disk is conducted outwardly toward the platens.

During the final expansion stage, the cellular rubber molds closely around the plugs, the latter being as hot as the platen and forms a strong skin on the interior of the tubular openings which is similar to the skin which is formed on the surfaces.

Where the cylindrical surfaces which are formed around the plugs 50 and 51 meet the flat, hard-skinned surfaces which form adjacent the platens 54 and 55, the accumulation of solid skin material is particularly heavy since the collapse of the cells is induced from two directions. This causes a good union of the reinforcement hard-skinned tubes and the hard-skinned surfaces as shown at 41, 41 in Figure 4.

When the disks are thus fully vulcanized to a finish and cooled, the aluminum plugs are then ejected.

The mold may actually comprise a circular disk with a hole in the center to support the pin 51. This circular disk may be laid on the lower platen and thus form a ledge for guiding the circular side or boundary 56 of the mold. In this case there need not be any upper surface to the mold since the upper platen of the press may constitute this upper surface.

In addition, as has been pointed out above, the aluminum plugs are slidable. They may be made slightly shorter than the distance between opposite surfaces of the molds or platen or should be so dimensioned that when final expansion occurs with its attending heat, the expansion of the aluminum plugs at that time owing to the elevated temperature will be sufficient to force the plugs tight between opposite surfaces of the mold. This can be readily accomplished since the coefficient of expansion of aluminum is greater than that of iron or steel. Such a tight fit, as above pointed out, not only prevents rubber from splaying over the top of the plug but also provides a good heat conductive path.

A disk reinforced in such manner will not only survive a greater compressive force, but also may without danger of explosion be filled with gas under pressure in a manner set forth in my co-pending application, Serial No. 407,729.

If, for instance, the pressure of the gas within the cell were at three atmospheres absolute (which is altogether possible), the compressive force of water at a depth of four hundred and fifty feet (two hundred pounds per square inch) would be opposed by two atmosphere pressures (thirty pounds per square inch), a reduction of pressure of about fifteen per cent from two hundred pounds per square inch to one hundred and seventy pounds per square inch.

Inasmuch as the reinforcing tubes are of non-cellular rubber, they also prevent any possible bulging of the disc while being under the lower atmospheric pressure.

In the foregoing, I have described my invention in connection with a preferred embodiment thereof. Many modifications and variations should now be obvious to those skilled in the art. I prefer therefore to be bound, not by the specific disclosures herein, but only by the appended claims.

I claim:

1. A buoyant cell-tight hard cellular rubber member, said member having a plurality of regularly spaced tubular openings therethrough, each of the openings having a lining of a hard rubber skin forming a tubular reinforcement, the outer surfaces of said buoyant member also having a hard rubber skin; the said tubular lining and the said outer skin being integral with each other, and forming reinforcing means adapting the buoyant member to withstand submarine pressures.

2. A buoyant cell-tight hard cellular rubber member, said member having a plurality of regularly spaced tubular openings therethrough, each of the openings having a lining of a hard rubber skin forming a tubular reinforcement, the outer surfaces of said buoyant member also having a hard rubber skin; the said tubular lining and the said outer skin being integral with each other and forming reinforcing means adapting the buoyant member to withstand submarine pressures, and a reinforcement at the connections between said tubular lining and said outer skin.

3. A buoyant cell-tight hard cellular rubber member, said member having an opening passing entirely through said member, said opening being lined with a dense hard rubber skin forming a tubular reinforcement for said member, adapting the buoyant member to withstand submarine pressures.

4. A buoyant cell-tight hard cellular rubber member, the cells of which contain gas under pressure above atmospheric, said member having an opening passing entirely through said member, said opening being lined with a dense hard rubber skin forming a tubular reinforcement, the outer surfaces of said buoyant member also comprising a hard rubber skin; the said tubular lining and the said outer skin being integral with each other, and forming reinforcing means adapting the buoyant member to withstand submarine pressures and the internal gas pressure.

5. A buoyant cell-tight hard cellular rubber member, the cells of which contain gas under pressure of the order of three atmospheres, said member having an opening passing entirely through said member, said opening being lined with a dense hard rubber skin forming a tubular reinforcement, the outer surfaces of said buoyant member also comprising a hard rubber skin; the said tubular lining and the said outer skin being integral with each other and forming reinforcing means adapting the buoyant member to withstand submarine pressures and the internal gas pressure, and a reinforcement at the connections between said tubular lining and said outer skin.

HANS PFLEUMER.